April 27, 1965  C. A. HEUER  3,180,011
HOLLOW ARTICLE MANUFACTURE BY FLUID PRESSURE
Original Filed April 29, 1957
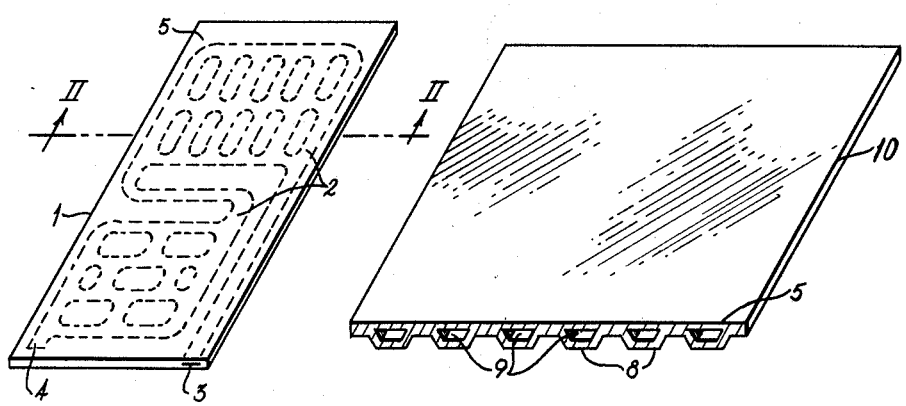
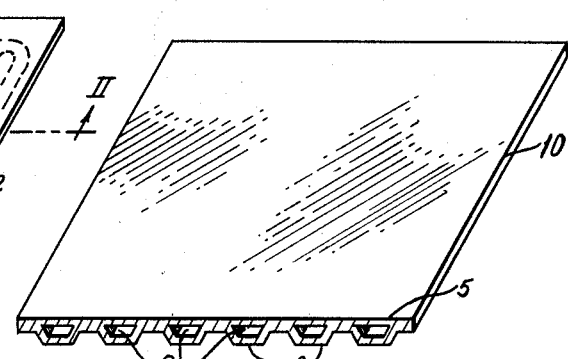
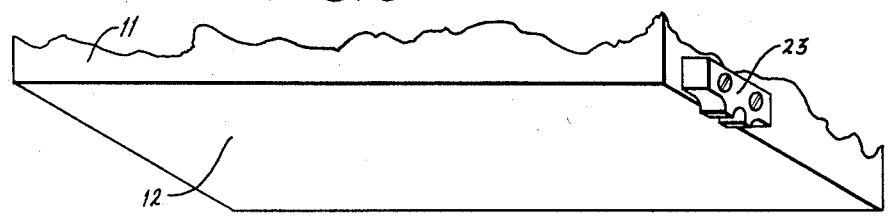
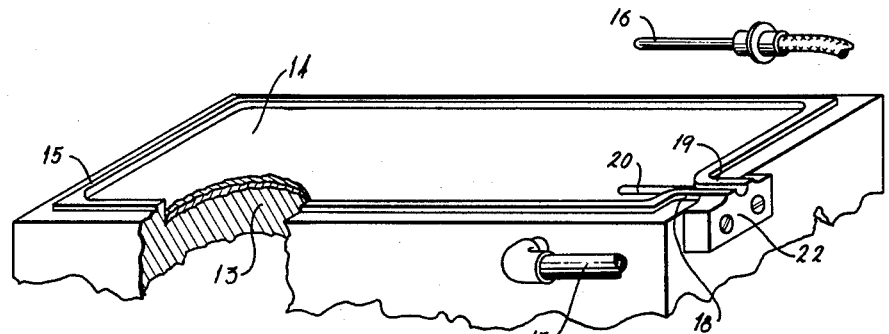
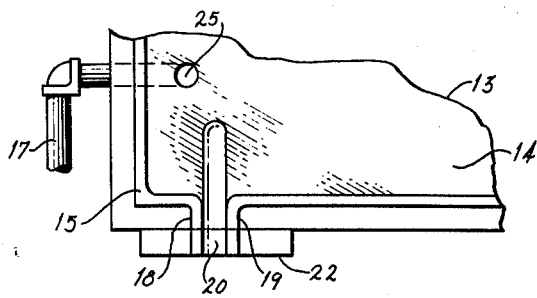
INVENTOR:
CHARLES A. HEUER
BY
ATTORNEYS

INVENTOR:
CHARLES A. HEUER
BY
ATTORNEYS

April 27, 1965            C. A. HEUER            3,180,011

HOLLOW ARTICLE MANUFACTURE BY FLUID PRESSURE

Original Filed April 29, 1957            3 Sheets-Sheet 3

INVENTOR:
CHARLES A. HEUER
BY
ATTORNEYS

United States Patent Office 3,180,011
Patented Apr. 27, 1965

3,180,011
HOLLOW ARTICLE MANUFACTURE BY
FLUID PRESSURE
Charles A. Heuer, East Alton, Ill., assignor to Olin Mathieson Chemical Corporation, East Alton, Ill., a corporation of Virginia
Continuation of application Ser. No. 655,576, Apr. 29, 1957. This application Sept. 1, 1960, Ser. No. 54,565
14 Claims. (Cl. 29—157.3)

This invention relates to the fabrication from sheet-like material of hollow articles and more specifically to the manufacture of such articles having one face substantially smooth or flat and suitable for various uses such as the freezing unit of an ice maker. This application is a continuation of copending application Serial No. 655,576 filed April 29, 1957, now abandoned.

The hollow sheet metal panels, although they may be made by various methods, are most advantageously and preferably made by a process such as described in U.S. Patent 2,690,002 issued September 28, 1954. This invention is particularly applicable to such a process wherein one of the weldable surfaces of one of a pair of component sheets is provided with a weld-preventing material in a definite pattern which over the area of the pattern will prevent welding of the areas separated by the weld-preventing material while in the areas not so separated the component sheets are unified in any suitable manner such as by hot rolling, after which welding operation the resultant blank is subjected to further manipulations for the purpose of expanding its unjoined portions by injection of inflation fluid under suitable pressure to permanently distend one side of the blank in the unjoined patterned area to develop the finished cavity or passageways of the hollow article.

An object of this invention is to make hollow articles in which the distention occurs on one side while the other side remains undistended and substantially smooth or flat. Another object is to provide distentions of a certain desired external configuration on the side of the blank deformed by fluid pressure and more specifically to provide a flat topped passageway or cavity protrusion on the side opposite the undistended side. Still another object of the invention is to provide freedom from surface bending and sinking which is manifested as improved smoothness or "flatness" on the undistended side of the blank. A further object is to provide an improved inflation apparatus and an improved blank for the preparation of the finished article. A still further object is to provide an improved method of fabricating hollow panels inflated to form protrusions on one side only as described in the aforementioned U.S. Patent 2,690,002, so that the undistended surface has an exceptionally high degree of smoothness or flatness.

Other objects and advantages will be apparent from the following description of a specific embodiment illustrated in the drawing in which:

FIGURE 1 is a perspective view of one suitable blank from which a hollow panel containing conduit passageways is to be formed in accordance with this invention;

FIGURE 2 is a fragmentary perspective view partially in section taken on line II—II of FIGURE 1 showing part of the finished article developed from the blank;

FIGURE 3 is a fragmentary perspective view showing general features of apparatus for practice of this invention;

FIGURE 4 is a fragmentary plan view showing the fluid pressure connections with respect to the surrounding part of the lower platen of the apparatus of FIGURE 3;

Figure 5:
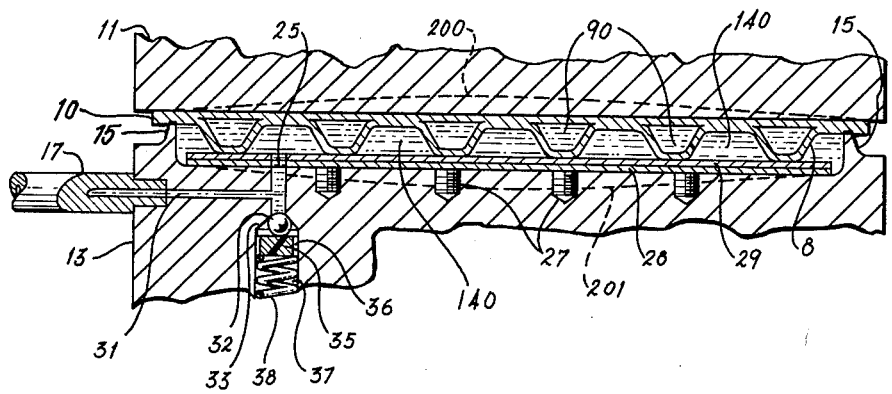
FIGURE 5 is an elevational view in cross section taken across the apparatus of FIGURE 3 after closure showing additional details of the apparatus and also the inflated article developed in the apparatus.

In accordance with this invention expansion of an inflatable blank is done while the blank is subjected to external confinement between at least one rigid die member and a body of fluid under pressure applied externally to only one side of the blank. One of the rigid die members, in the form of a press platen with a suitably shaped die surface, such as a flat one in particular, acts on one side of the blank while the fluid, and preferably a suitable incompressible liquid such as water, oil or the like, acts on the other side of the blank so as to constrain it between the die surface and the fluid or liquid during the continued application of inflation fluid pressure internally of the blank. The externally applied fluid pressure provides the confinement or constraint which was found to result in improved hold-down action for the purpose of obtaining superior resistance to distention on one side of the blank while the other is distended.

External application of the hold-down fluid pressure has been found to give not only improved resistance to undesired bending and distortion in the side of the blank to remain undistended but to also provide improved expansion of the distended portions of the blank to final finished size and shape.

It is also contemplated that in accordance with this invention one-sided expansion will occur not only with the aid of external fluid pressure but also with the aid of a second rigid die member which acts together with the hold-down fluid to control the height and the shape of the expanded portions of the blank. Such member may also in addition act to prevent rupturing during expansion at higher pressure differentials between the internally and externally applied fluid pressures. The working surface of the second member may be recedable from the first and continuously contact the distention during expansion. Such second rigid die member is ordinarily recessed to a depth corresponding to the final height of distention, but the depth may be varied by any suitable means such as shims retained in the bottom of the recess. It is contemplated that such shims be of the replaceable type retained by readily releasable means and specifically by magnetic means.

The periphery of the recess is sealed upon the blank to prevent access of the external pressure to the other side which is to remain undistended and to be pressed against the first rigid die member and take its shape, which may be that of a flat or gently curved plane. Between the blank and this first or usually flat die no deforming fluid pressure is to be applied; and to further avoid any chance occurrence of it, whether by entrapment or otherwise, suitable venting means may be employed such as an interposed screen or such as venting ducts or pores in the die member. Thus the die member may be constructed of porous metal for venting and may have a vacuum connection. Furthermore, for venting purposes either the face of this die member or the to-be-juxtaposed face of the blank could be provided with scoring or scratching where necessary for the best expansion. Where pressure relief is not provided in the apparatus pressure relieving surfacing such as knurling, scratching or the like may be employed in the blank.

The periphery of the recess is preferably a surrounding ridge adapted to clamp and preferably indent the periphery of the blank to effect an excellent seal. The ridge may be sharp, rounded or flat. A sealing gasket of any suitable type, such as an element of deformable or resilient material, may also be used with or instead of the ridge.

Various pressure levels, both internal and external, and various pressure level differentials are contemplated and may be varied in accordance with the type of blank employed, the thicknesses of the blank, the degree of distention desired and the shape and configuration of the distentions to be produced. In accordance with the concept of this invention, the operator need merely make the necessary variations and adjustments until the desired distentions are obtained on one side of the blank together with suitable freedom from distentions on the other side. The best results are obtained for each blank with the desired cavity configuration and height of distention at some particular combination of internal and external pressure to be determined in each instance by the operator.

The external or hold-down pressure may be applied simultaneously with the internal expansion pressure but is preferably applied ahead of it to minimize initial distortions which can be erased only with difficulty, if at all. Similarly, the pressures are preferably released simultaneously which in some instances may be accomplished automatically by release of the internal pressure. While simultaneous release of the pressures is preferred it is permissible under certain conditions of operation to release the internal pressure prior to external pressure but in no event should the external pressure be released before the internal pressure unless or until the internal pressure is low enough after one-sided distention has been accomplished so as not to impart a further distention to the other side, which is to remain substantially unexpanded. In some cases premature release of internal pressure may cave in the crests, and particularly flattened crests, of the distended portion of the article.

Although various inflatable blanks are contemplated for working in accordance with this invention, it has been found that surface deformation and/or hardening of the blank on the side to remain uninflated imparts to it an improved tendency to remain flat on one side and adapts it especially for this invention. Such a surface condition may be obtained by scratching, knurling, embossing, indenting and the like. A most severe and uniform surface effect is obtained by shot peening.

A suitable form of blank 1 is shown in FIGURE 1 and includes a particular configuration of internally unjoined area 2 which extend to a peripheral parting line 3 at which internal pressure may be applied to expand the blank. After expansion the blank may be cut through another unjoined portion 4 to which another connection may be made.

Following expansion in accordance with this invention, one surface 5 of the blank 1 remains undistended as shown in FIGURES 1 and 2 while the other is distended at 8 to form the cavity or passageways 9 of the finished article 10 shown in FIGURE 2.

Forming of the finished article occurs in accordance with this invention in suitable apparatus, such as that shown in FIGURES 3, 4 and 5, characterized by an upper unrecessed die or platen 11 and a lower platen 13 having a suitable recess 14. Ridge 15 surrounds die recess 14 as its rim and is adapted to press the blank 1 against the unrecessed or flat surface 12 of die member 11. Ridge 15 terminates at spaced peripheral portions 18 and 19 to make a suitable connection with the internal fluid pressure clamping members 22 and 23 adapted to coact with the fluid inlet means 16 which is placed to extend between the die members into blank opening 3 in any suitable manner and with the aid of clearance supplied by groove 20. Upon closure of the platens upon the blank, hold-down fluid pressure is applied to one side of the blank through opening 25 of the recessed die member 13 through any suitable connection such as 17.

In FIGURE 5 the inflated blank making article 10 is shown with distentions 8 of final finished size expanded to a height determined by the presence of shims 28 and 29. These are retained with reliability in the bottom of the die recess 14 by means of a series of magnetic devices 27 which advantageously take the form of externally screw threaded studs of non-magnetic material such as brass or stainless steel having U-shaped permanent magnets contained therein with the pole faces at the tops of the studs 27 facing the shims. Lower die member 13 preferably contains a check valve for fluid pressure relief.

The pressure relief valve consists of a ball check 32 normally engaging a conical seat 33 to close discharge bore 37 from the inlet opening 25 unless the pressure fluid 140 exceeds a predetermined pressure level. The desired pressure level is maintained by means of a vented follower 35 and a coil spring 38 mounted in the bore 37 to act with adjustable compression on the ball 32.

Excessive pressure is bled off through vents 36 and the bore 37. Excessive pressure of the fluid 140 would manifest itself in springing of the die faces from each other to some positions such as 200 and 201 with resultant undesired variation in the distended height of the expanded portions 8. Furthermore, sprung press platens would have the tendency, undesirable under certain conditions of operation, of acting as bellows so as to give the fluid the characteristics of a compressible fluid or a resilient medium.

Hydraulic fluid 140 is first applied in the recess through die conduit 31 and recess inlet 25 against the blank as it is pressed on rims 15 by means of the other die member 11. Fluid 140 is preferably a liquid such as water applied at a suitable pressure such as 1000 p.s.i. Next the inflation fluid 90 is applied internally of the blank to accomplish expansion while the pressure of fluid 140, continued to be applied externally of the blank, maintains and reshapes the expanding blank in such a way as to hold it flat against the unrecessed die member 11. Fluid 90, preferably a liquid such as water, is applied at a pressure suitably in excess of the pressure of liquid 140 to accomplish the result desired. An inflation pressure from about 2800–3000 p.s.i., for example, has been found suitable in combination with an external hold-down pressure of about 1000 p.s.i. to shape one certain thickness of a certain metal blank. It will be understood that other pressure levels and differentials may be employed as found necessary with the various hardnesses and thicknesses of the blanks used. In any event, the operator will vary the pressures and employ that differential of pressure found necessary in each particular instance to provide suitable freedom from distention on one side.

Figure 6:
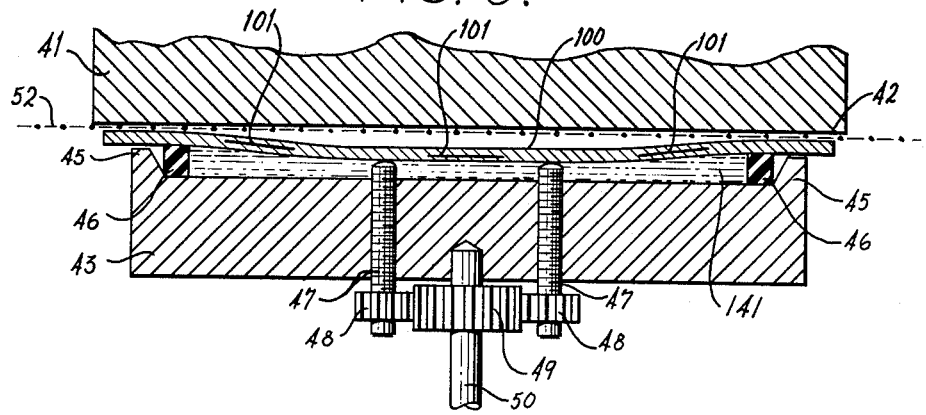
FIGURE 6 is a semi-schematic elevational view in cross section showing another form of suitable apparatus with another blank in position for inflation.
Figure 7:
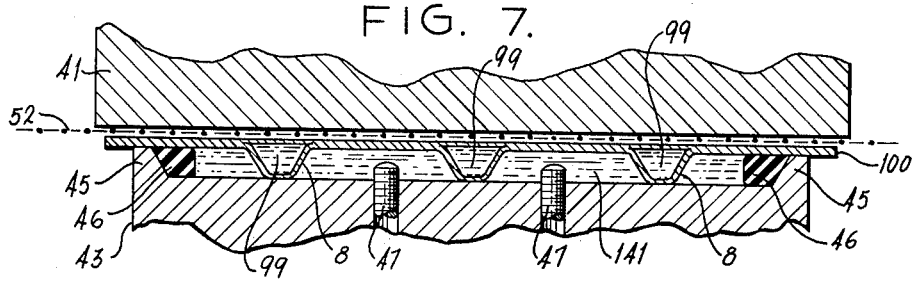
FIGURE 7 is a partial view of the apparatus of FIGURE 6 at full inflation of the blank.

In the modification of FIGURES 6 and 7, a blank 100 is placed between an upper flat platen 41 having a flat face 42 and a lower complementary recessed die 43 having the peripheral rim 45 and the sealing gasket 46 of any suitable resilient material, such as rubber. Lower die 43 is also provided with a suitable number of screw-controlled advancing and retreating members 47 for controlling the volume of liquid 141 in the die recess. Control is obtained by the screw down 50 connected in any suitable manner such as by gear 49 to mating gears 48 on the members 47. These members limit the sag of the blank 100 upon its being placed between the open platens as shown in FIGURE 6 to rest on the peripheral gasket 46. The amount of sag of the blank 100 and the displacement of the members 47 in the die recess determine the volume of liquid displaced from the die recess and the working volume 141 remaining therein. The apparatus also includes suitable venting means such as the screen 52 between the blank 100 and the platen 41.

In operation, closure of the apparatus compresses the gasket 46 to seal the liquid 141 in the cavity and also compresses the blank 100 against the rim 45 which in this particular modification has a height equal to the desired distance of the to-be-expanded portions 8. Upon application of the internal fluid pressure 99 acting in combination with the predetermined external volume of fluid 141, the fluids press the blank 100 flat against the screen 52 and platen 41 and concomitantly expands the portions 8 until they are flattened against the bottom of the die recess and until the external fluid 141 occupies all of the space remaining in the recess and is pressurized by the action of the internal fluid 99.

As illustrated in FIGURE 7 the sealing ring 46 is supported on and cooperates with the operative surface of platen 41 to define, with this surface, a holding pressure cavity for the external volume of fluid 141 employed for the desired one side expansion of blank 100. As can be seen, sealing ring 46 defines the side wall of the holding pressure cavity, and this ring is backed up by peripheral rim 45 to peripherally retain this sealing ring 46 against radial displacement during the one side inflation of blank 100.

Figure 8:
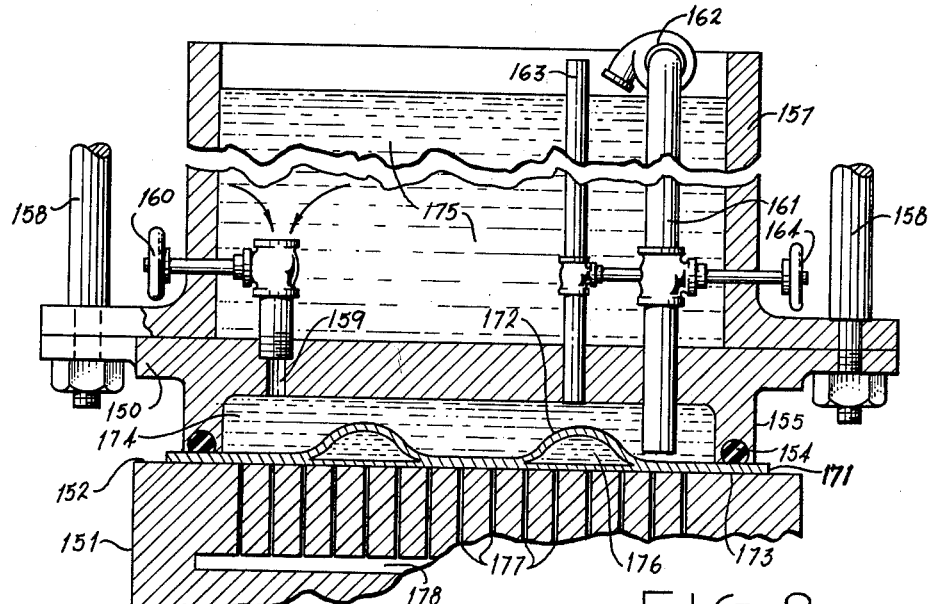
FIGURE 8 is a cross sectional view showing a modified form of apparatus for expansion of the bulbous parts of the finished article.

The apparatus of FIGURE 8 illustrates that the recess may be placed in the upper as well as the lower platen, that the one-sided flattening pressure as well as the venting can be obtained by various procedures, and that the expansion may in some instances be less than the depth of the die recess.

The apparatus consists of a lower flat platen 151 and an upper recessed platen or die 150 having a peripheral rim 155 the contacting face of which is provided with an O-ring seal 154. Rim 155 and the O-ring 154 are adapted to press the blank for making article 171 in the vicinity of its periphery and close the recess of the die 150 thereabout. The recess of die 150 is associated with a water pressure applying tank 157 containing a main body of water 175 at any desired head. The volume of water 174 is admitted from the tank 157 to the die recess by means of the inlet opening 159 under the control of the valve 160 while venting of the die recess is obtained by means of the standpipe 163 and also by means of the evacuation pipe 161, both of which pipes are controlled by a gang valve 164.

In operation, the upper recessed die 150 and its associated tank 157 are moved into and out of engagement with the blank 171 by any suitable means such as the drive members 158.

With the valve 160 in closed position, die member 150 is lowered upon a blank positioned on the platen 151 which contains a vacuum connection 178 communicating with the series of vents 177 leading to the flat face 152 of platen 151. With the valve 160 opened, liquid is admitted to fill the die recess with the blank hold-down liquid 174 to act on the outside of the blank. Next, the internal inflation fluid 176 is injected into the unjoined interior areas of the blank, wherein it is maintained for a short time, as indicated below and in Table I, at the pressure necessary to develop the distortions 172 for article 171 to the shape desired and permitted by the confining fluid 174 at its pressure head. Under the combined pressures and with the aid of vents 177, the article is maintained in a high degree of flatness against the surface 152.

With the blank thus worked to the shape of the final finished article, valve 160 is closed. The internal fluid pressure 176 is then relieved. The valve 164 is opened to permit energizing of the pump 162 to empty the recess of the portion of water 174 therein. The upper die 150 is then lifted from the finished sheet 171 and the vacuum relieved to complete a cycle of operation.

According to one example of the practice of this invention an inflatable blank of suitably knurled or embossed aluminum about 0.060 of an inch thick and having a tube wall thickness, each about 0.030 of an inch in the unjoined portion defined by a stratum of weld preventive, was expanded with a hydraulic pressure of about 2800 p.s.i. applied internally for a short time and concurrently with external confining hydraulic pressure applied by a pressure cylinder and limited to a maximum varying from about 1400 p.s.i. to 1300 p.s.i. with satisfactory results. This pressure of about 2800 p.s.i. is the expansion pressure necessary to develop the desired distention in correlation with the specifically enumerated confining hydraulic pressure employed. As indicated above this expansion pressure of 2800 p.s.i. was applied internally for a short time in order to fully develop the desired distention, the value of which, as reflected in Table I, was found to be a minimum of 3 seconds. Upon simultaneous release of both pressures, the amount of the distortion on the flat side was found to be negligible and never exceeded 0.005 of an inch at the higher external pressure. Even at the lower pressure the distortion was relatively negligible and was never more than about 0.010 of an inch at the few places where it was readily observable. Confinement between the faces of the die members imparted a desired flat contour to the top of the ⅜-inch passageway distentions as well as to the flat side of the finished panel and served to gauge the expansion to an internal tube height of a nominal 0.060 of an inch.

In accordance with the practice of the invention at other pressure differential levels, many other surface embossed blanks of aluminum of about the same thickness were subjected at various operating conditions to obtain results as set forth in Table I which follows. With the indicated internal expanding water pressure the external reshaping and holding water pressure applied by pressure cylinder was varied as indicated in a press cavity such as to produce a total tube height of around 0.0120–0.130 of an inch. By varying the pressure differential, the departure from flatness on one side and the relative distention of both sides may be controlled to obtain desired configuration.

*Table I*

| Internal pressure applied | Time* (seconds) | External pressure, p.s.i. | Distortion |
| --- | --- | --- | --- |
| 2,800 | 8 | 1,100 | Too small to measure. |
| 2,800 | 8 | 980–1,400 | 0.005″ and less. |
| 2,800 | 4 | 800–1,200 | 0.008″ and less. |
| 2,800 | 5 | 1,000 | 0–0.005″. |
| 2,800 | 5 | 975 | 0–0.003″. |
| 2,800 | 5 | 950 | 0–0.007″. |
| 2,800 | 5 | 800–900 | 0–0.010″. |
| 2,800 | 8 | 1,360 | 0–0.005″. |
| 2,800 | 8 | 1,200 | 0–0.003″. |
| 2,800 | 3 | 1,200 | 0–0.005″. |
| 2,800 | 4 | 1,000 | 0–0.008″. |
| 2,800 | 8 | 900 | 0–0.005″. |
| 2,800 | 3 | 800 | 0–0.005″. |

*Time indicates period of time the indicated internal Pressure was applied internally of the inflatable blank concurrently with and during application of the indicated External Pressure on the face of the blank to urge and confine it against a die surface disposed adjacent the opposite face of the blank in accordance with this invention.

The hollow articles made in accordance with this invention may be expanded from various suitable blanks such as that disclosed in aforementioned U.S. Patent 2,690,002, for example, or that disclosed in copending patent application Serial No. 572,648 filed March 20, 1956, by Robert Milton Neel and Clarence A. Isbell, Jr.

The blank may be of any shape such as a flat or curved sheet, a cup, a cone, or other surface of revolution.

Figure 9:
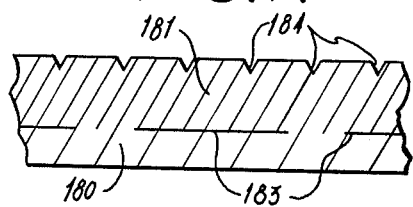
FIGURE 9 is a cross sectional view of part of another form of blank adapted for practice of this invention.

A particularly suitable blank is shown in FIGURE 9. Such a blank is originally formed from two component sheets 180 and 181. Component 180 is thinner than component 181 the latter of which is preferably also different from the former by being harder because of a difference in composition and/or heat treatment. The unjoined areas 183 of the resultant blank are adapted for distention on one side over a portion of component 180 leaving the other side, surfaced by component 181 and having shallow elongated depressions 184, relatively flat. The surface depressions 184 act as pressure relieving vents for any air or liquid which may be trapped between the to-be-flat side of the blank and the flat platen of the inflation press especially in the absence of any pressure relieving depressions in the platen surface or absence of the relieving screen.

In the actual practice of the invention, however, maintenance of flatness has been found to present practical difficulties because of bending which occurs intermediate the beginning and end of the inflation and is localized at certain portions and particularly at the juncture of the unjoined end solid portions of the blank. While continued inflation of the blank tends at high pressures to erase such intermediate bending in certain instances and particularly where the blank has a cavity design with many sharp corners, the ultimate lack of perfect flatness is noticeable to an undesired degree, unless the blank is modified on one side to resist deformation. In accordance with a further aspect of this invention, it has been found that blanks of the type shown in FIGURES 10 and 11 result in a finished article having an undistended side of improved smoothness or substantial flatness.

Figure 10:
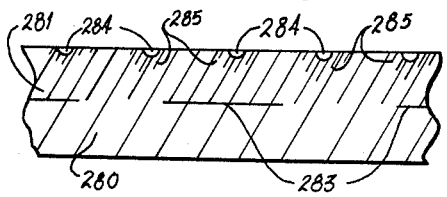
FIGURE 10 is a cross sectional view of part of a modified form of blank found to be especially advantageous.

The blank of FIGURE 10 consists of a first component 280 and a second component 281 the latter of which is adapted to form the "flat" side of the finished article upon inflation of the unjoined portions 283 of the blank. The surface of the side of the blank formed by component 281 is provided with depressions 284 by any suitable plastic deformation method such as stippling, knurling or rolling of the blank at a reduction of about 10% or more simultaneously with a relatively undeformable mandrel member such as a hard sheet with protrusions or a metal screen. In the locale of each depression 284 the adjacent subsurface metal has been found to be work hardened as at 285. The effect of the worked areas 285 is to produce an overall surface stiffening in the blank.

Figure 11:
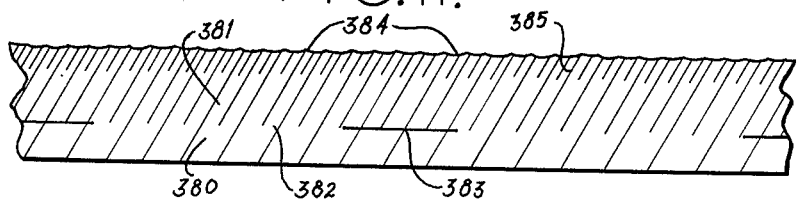
FIGURE 11 is a cross sectional view of part of a still further modification of blank.

The blank of FIGURE 11 consists of a relatively thin component side 380 joined at portions 382 to a relatively thick component side 381 while remaining unjoined at portions 383. Component 381 is not only thicker but also harder than component 380. The immediate subsurface layer 385 of component 381 is additionally and uniformly work hardened as compared to the rest of component 380 over the entire surface by shot peening at the surface 384. This is particularly advantageous where depressions or stippling are not desired on the "flat" side of the blank to interfere with a desired surface finish and where the partial surface hardening effect of stippling or knurling is not sufficient for certain applications. This section of the blank will be found upon inflation to final finished configuration to be quite flat on one side and to be well distended on the other side in the sections of component 380 underlying portions 383.

To produce the finished article from such blanks it is positioned between the open die members with the scored, pitted, knurled or peened side adjacent the rigid flat or smooth die member and then expanded. Afterward the pitted side may be polished if such surface deformations are objectionable in its further use.

Following expansion of the blank, the pressures may be released simultaneously, instantaneously or slowly in such desired ratios of pressures as are found suitable by the operator for each particular condition of composition, thickness, hardness, or final height of distention.

While the foregoing has been described chiefly with reference to incompressible fluids such as suitable liquids as the preferred embodiment, it is to be understood that those skilled in the art may employ compressible fluids particularly as the internal inflation fluid and even as the hold-down fluid. One advantage of an incompressible liquid for external hold-down pressure application as compared to resilient or compressible members such as gases or pads is that upon relieving the internal pressure, the external pressure also may be spontaneously relieved. Furthermore, during application of the pressure, the externally applied liquid acts as if it were a solid cavitated die free from the resilience which tends to press back upon the work piece and impair the shape of the passageways developed by distention. Compressible fluids, unless carefully controlled, act like a premature internal pressure release and tend to collapse the distended portion of the article as evidenced by "caving-in" along the crests of the protrusions.

There is still another advantage in that a fluid in contrast to a resilient solid hold-down member will act upon the unexpanded area of the blank intermediate the distentions from beginning to end of the hold-down period whereas a solid applies itself later to such area and disengages from it prematurely with resultant impairment of the contour of the "flat" side.

Although the foregoing embodiments are now believed to be preferred, it is to be further understood that other changes and modifications may be made by those skilled in the art without departing from the spirit and scope of this invention and that the foregoing is intended by way of an illustration of the invention rather than as a limitation except as set forth in the appended claims.

What is claimed is:

1. The method of forming a hollow article having a cavity within the confines of that part of it which is unidirectionally distended from a sheet blank having an unjoined interior portion intermediate two of its opposite outer faces and extending therein in a desired predetermined configuration comprising initially positioning at least part of said blank between a pair of opposed rigid press members with at least part of at least one of said faces of said blank against a die surface of said press members, closing said die members against said blank to maintain said die members spaced from each other by no less than the final predetermined height of distention desired, outwardly distending said blank in the area of said unjoined portion by applying an inflation fluid under pressure internally of the blank while applying a hold-down fluid externally of the blank to only one of said faces of said blank under pressure sufficient to maintain substantially all of at least said part of the other one of said initially contiguous faces of said blank in substantial contiguity continuously with one of said rigid members during the application of said inflation fluid, and maintaining said inflation fluid pressure internally of said blank concurrently with the application of said hold-down fluid pressure for at least three seconds, said period of time of at least three seconds being sufficient to fully distend said blank.

2. The method of claim 1 wherein the hold-down fluid is incompressible and is itself confined in a recess of one of said rigid press members while it is sealingly clamped against said blank.

3. In the method of expanding a blank comprising a single integral sheet including an expandable unjoined interior portion largely disposed inwardly of the periphery of said blank and also a solid interior portion adjacent and at least surrounding said unjoined area except for at least one place forming an entry opening, the steps comprising positioning said blank between substantially rigid open die members one of which has a die cavity surrounded by a rim, and the other of which has a die surface adapted to be put into engagement with said blank for clamping said blank against said rim, closing said die members against said blank, introducing a substantially incompressible fluid into said cavity at a first pressure level for limiting the expansion of the unjoined interior part to one side of said blank while holding substantially all of the other side of said blank in substantial contiguity with said other die member, applying inflation fluid along said unjoined portion internally of the blank to distend and shape the unjoined part of the blank to a final finished protruding shape by injecting said fluid at said opening at a second pressure level sufficient to move the fluid in said cavity while continuing said shaping expansion to reshape the exterior of the panel to said final finished one-sided distention and predetermined size, and maintaining said inflation fluid internally of said blank for at least three seconds at said second pressure level concurrently with the application of said fluid externally on said blank at said first pressure level, said period of time of at least three seconds being sufficient to fully distend said blank.

4. The method of claim 3 wherein the bottom of the die cavity and the opposite surface of the other die member are in parallel relationship and are both initially pressed into contact with said blank at least in the section of the blank to be expanded and both are maintained during expansion in substantial contiguity with the side of the blank to remain substantially flat and part of the distention of the other side of said blank respectively, for obtaining a maximum flat-topped expansion of the unjoined portion, and wherein the bottom of the cavity is finally recessed from said opposite die surface to a depth corresponding to the final predetermined height of expansion.

5. In the method of expanding a blank comprising a single integral sheet including an expandable unjoined interior portion largely disposed inwardly of the periphery of said blank and also a solid interior portion adjacent and at least surrounding said unjoined area except for at least one place forming an entry opening, the steps comprising supporting said blank upon a lower die member having a die cavity surrounded by a rim, introducing a predetermined volume of substantially incompressible liquid into said cavity for hydraulically limiting the expansion of of the unjoined interior part of said blank, moving an upper die member having a substantially planar rigid die surface into engagement of said surface with said blank for clamping said blank between said surface and rim for sealing said die cavity while holding said periphery of said blank by said upper die member to prevent lateral distortion thereof, applying pressure to distend and shape the unjoined part to a final desired shape by applying inflation fluid to said opening through a fluid connection under sufficient pressure to move the liquid in said cavity to reshape the exterior of the expanded portion of the panel to said final desired shape determined by said liquid and by contact of at least part of the expanded part with the bottom of the cavity opposite said upper die surface, maintaining said inflation fluid pressure internally of said blank for at least three seconds concurrently with the pressure of said liquid in said die cavity, said period of time of at least three seconds being sufficient to fully distend said blank, and releasing said internal fluid pressure and the pressure of said liquid substantially simultaneously to provide a substantially flat surface on at least said one side of said expanded portion.

6. The method of claim 5 wherein the blank is supported on the rim of the lower die and is permitted to sag into the lower die cavity sufficiently to displace a portion of the liquid from said cavity and leave a predetermined volume of liquid therein sufficient to limit the expansion of the unjoined portion of the blank to desired shape into said die cavity.

7. The method of claim 5 wherein the volume of liquid fills the unoccupied void of said cavity and is maintained at not less than a predetermined pressure level by means of a pressure relief valve sufficient to impart flatness.

8. The method of expanding a blank consisting of a single integral sheet including an expandable unjoined interior part largely disposed inwardly of the periphery of said blank and a solid interior part adjacent and surrounding at least the major part of said unjoined portion comprising applying inflation hydraulic pressure to the interior surfaces of said blank and simultaneously applying a shaping hydraulic pressure to one exterior surface while maintaining a pressure differentially sufficient to produce a distention of said unjoined portions to a desired configuration, and maintaining at said pressure differential said inflation pressure internally of said blank for at least three seconds concurrently with the application of said shaping pressure to said one exterior surface, said period of time of at least three seconds being sufficient to fully distend said blank.

9. A method of expanding a blank formed of two superimposed sheets having portions of their adjacent surfaces welded together and other portions between said sheets unwelded in accordance with a predetermined pattern defining a desired system of fluid passages adapted for expansion with fluid pressures by the steps comprising surface hardening one side of said blank to thereby stiffen said one side against deformation during subsequent distention of the opposite side of said blank, applying a shaping hydraulic pressure to said opposite side of said blank to press said one side of said blank tightly against a surface and to hold it there during said subsequent distention of said unwelded portions, applying an inflating hydraulic pressure internally of said blank along said unwelded portions with said inflating pressure and said shaping pressure maintained at a pressure differential sufficient to expand said unwelded portions to the desired distended configuration.

10. The method of claim 9 wherein said one side is hardened by mechanically providing in said one side a series of shallow elongated depressions.

11. The method of claim 9 wherein said one side is hardened by embossing said one side.

12. The method of claim 9 wherein said one side is hardened by knurling said one side.

13. The method of claim 9 wherein said one side is hardened by shot peening said one side.

14. The method of claim 9 wherein said one side is hardened by mechanically treating said one side.

References Cited by the Examiner

UNITED STATES PATENTS

| | | | |
|---|---|---|---|
| 1,784,866 | 12/30 | Fahrenwald. | |
| 1,833,025 | 11/31 | Langenberg. | |
| 2,866,429 | 12/58 | Staples | 113—44 |
| 2,949,876 | 8/60 | Staples | 113—44 |
| 2,966,730 | 1/61 | Thomas | 29—157.3 |
| 2,994,946 | 8/61 | Reynolds | 29—157.3 |
| 3,003,228 | 10/61 | Thomas. | |
| 3,067,491 | 12/62 | Neel et al. | |
| 3,094,956 | 6/63 | Pauls. | |
| 3,098,290 | 7/63 | Thomas. | |

WHITMORE A. WILTZ, *Primary Examiner.*

NEDWIN BERGER, *Examiner.*